United States Patent
Salas Palacios

(10) Patent No.: US 11,390,338 B2
(45) Date of Patent: Jul. 19, 2022

(54) URBAN VEHICLE FOR TRANSPORTING LARGE-VOLUME, LIGHTWEIGHT CARGO

(71) Applicant: Edgardo Washington Salas Palacios, Lima (PE)

(72) Inventor: Edgardo Washington Salas Palacios, Lima (PE)

(*) Notice: Subject to any disclaimer, the term of this patent is extended or adjusted under 35 U.S.C. 154(b) by 75 days.

(21) Appl. No.: 16/756,532

(22) PCT Filed: May 11, 2018

(86) PCT No.: PCT/PE2018/000011
§ 371 (c)(1),
(2) Date: Apr. 16, 2020

(87) PCT Pub. No.: WO2019/078738
PCT Pub. Date: Apr. 25, 2019

(65) Prior Publication Data
US 2020/0290690 A1   Sep. 17, 2020

(30) Foreign Application Priority Data
Oct. 16, 2017   (PE) .................. 002193-2017/DIN

(51) Int. Cl.
*B62D 53/06* (2006.01)
*B62D 53/08* (2006.01)
(Continued)

(52) U.S. Cl.
CPC ......... *B62D 53/06* (2013.01); *B62D 53/0842* (2013.01); *B60D 1/015* (2013.01);
(Continued)

(58) Field of Classification Search
CPC ................ B62D 53/06; B62D 53/0842; B62D 53/0864; B62D 53/0878; B62D 59/04;
(Continued)

(56) References Cited

U.S. PATENT DOCUMENTS 2,804,314 A   8/1957   Billingsley
3,250,547 A * 5/1966   Myers ................ B62D 53/0878
                                           280/432
(Continued)

FOREIGN PATENT DOCUMENTS

GB          1551166 A      8/1979

*Primary Examiner* — Kevin Hurley
*Assistant Examiner* — Marlon A Arce
(74) *Attorney, Agent, or Firm* — Eugenio J. Torres-Oyola; Victor M. Rodriguez-Reyes; Rafael Rodriguez-Muriel

(57) ABSTRACT

The present invention relates to an urban vehicle for transporting large volume and light weight cargo that is subdivided into two: a mini-tractor unit and a lightweight semi-platform. These are coupled by means of a fifth wheel with a kingpin, allowing transporting high cubic coefficient products including long formats.

The mini-tractor unit of the invention is shorter between the steering and drive axles compared with a vehicle for transporting cargo of the common type. The wheelbase between the steering (front) and driving (rear) axles of the mini-tractor unit is 1.3 to 1.7 times the width of the steering axle. With these proportions, the wheelbases or measurements between the front steering axle and the rear drive axle are determined; the drive shaft between the gearbox output and the transmission crown where the semi-drive axles are located is shorter between 40% and 60% with respect to the common type vehicle drive shaft, which facilitates the reduction of the total length of the original chassis, including the elimination of the rear overhang, achieving a shorter total length in a range that varies from 15% to 25%.

11 Claims, 5 Drawing Sheets

(51) Int. Cl.
  *B60D 1/30* (2006.01)
  *B60D 1/62* (2006.01)
  *B60D 1/01* (2006.01)
  *B60D 1/24* (2006.01)

(52) U.S. Cl.
  CPC ............. *B60D 1/245* (2013.01); *B60D 1/30* (2013.01); *B60D 1/62* (2013.01); *B60G 2202/152* (2013.01); *B60G 2300/042* (2013.01); *B62D 53/0864* (2013.01)

(58) Field of Classification Search
  CPC .............. B62D 53/08; B60G 2202/152; B60G 2300/042; B60D 1/015; B60D 1/245; B60D 1/30; B60D 1/62
  See application file for complete search history.

(56) References Cited

U.S. PATENT DOCUMENTS

| | | | |
|---|---|---|---|
| 3,355,043 A | | 11/1967 | Talbert |
| 3,592,488 A | * | 7/1971 | Holloway .......... B62D 53/0878 |
| | | | 280/262 |
| 5,449,191 A | * | 9/1995 | Cattau ................ B62D 53/0807 |
| | | | 280/407 |
| 5,690,347 A | * | 11/1997 | Juergens .................. B60T 7/12 |
| | | | 280/432 |
| 6,231,064 B1 | | 5/2001 | Curry |
| 8,333,399 B2 | * | 12/2012 | Brown ............... B62D 53/0814 |
| | | | 280/438.1 |
| 2010/0301584 A1 | | 12/2010 | Pipe et al. |
| 2020/0164935 A1 | * | 5/2020 | Newton ................. B62D 53/12 |
| 2021/0260944 A1 | * | 8/2021 | Metternich ............ B62D 53/08 |

* cited by examiner

URBAN VEHICLE FOR TRANSPORTING LARGE-VOLUME, LIGHTWEIGHT CARGO

TECHNICAL FIELD

The present invention is found in the technical sector of urban cargo vehicles, specifically in that of large volume and light weight cargo vehicles.

STATE OF THE ART

Many finished products and raw materials for final consumption as industrial use are characterized by low weight and high volume. This type of cargo is known as "high-cube-ratio" cargo.

These products to be transported to different destinations present problems with opportunities not solved by the automotive industry, which maintains an offer with technical characteristics with reverse performance to the logistic transport for the goods described. The current technical proposals increase the useful load capacity by proportionally increasing the robustness of the bodywork, chassis, motor and volumetric load capacity. In this way, by means of robust and heavy bodyworks of great volume that use engines of greater power (superior to 300 Hp in some cases) they maintain or increase only slightly the volumetric load capacity in these vehicles (for example, a tractor-trailer of the common type); which do not provide an efficient solution for the problem that is described.

The problem increases when finished products or raw materials with a high cubic coefficient are distributed, including long formats that protrude from typical platforms when transiting urban spaces, where vehicle traffic is intense and regulated according to the dimensions and weights of the transport units that are conventionally used. The usual technique is to use tractor-trailers with semi-trailers of 13 or more meters in length for long-format raw materials; the trucks, mini-trucks, light trucks or boxcars with rigid or supporting chassis facilitate transporting and distribution of high-cube-ratio goods that do not contain long formats.

The vehicles described have different motor powers (with ranges that vary between 40 and 400 kW), have gear boxes and clutches manufactured for transporting weights in a range that varies from 130 kilos to 1 ton for each cubic meter of their total load capacity in their semi-platforms, trailers or boxcars; such characteristics exceed the requirements of the purpose of the solution of the present invention because these vehicles use all the volume of their cubic capacity and use small portions of their useful load and of their motor power. In these scenarios, the heaviest transported load is the vehicles themselves and not the goods load. These vehicles are usually over-dimensioned in power and load, but under-dimensioned in cubic capacity for transporting low weight and high volume finished products and raw materials also known as "high cubic coefficient."

The state of the art shows us that the US patent with publication number U.S. Pat. No. 6,231,064 describes a vehicle of large proportions with a retractable chassis (it lengthens and shortens), forming a tractor-trailer/semi-trailer/trailer assembly or a combination of all of the above to increase the usual length of a tractor-trailer with semi-trailer by coupling a second semi-trailer by means of more than a fifth wheel with its respective kingpins where they pivot freely between both semi-trailers, depending on whether the first becomes fixed.

The usual technique in this type of motor vehicles is to increase the load capacity of a tractor-trailer by coupling a semi-trailer or to use a truck or tractor-trailer to which a second trailer is coupled, either a balanced trailer or a trailer with a steering axle.

In this patent, the inventor recognizes the limitations of tractor trailers with semi-platforms typically 18 meters long to circulate within cities or urban spaces due to the restrictions in the US federal legislations that prevent the transit of this type of vehicles within the cities; therefore, his invention seeks to maximize the transport in greater proportions, weights and volumes than those usually employed outside the cities, more specifically in highways and outside them.

The US patent with publication number U.S. Pat. No. 3,355,043A describes a tow truck of the tractor type equipped with fifth wheel which is mounted on a frame that pivots on a horizontal axle located in the rear end of the chassis; the novel system allows the vertical elevation of the semi-trailer or a wagon type bodywork attached by means of the kingpin to the fifth wheel to elevate it on the vertical axle of the rear end, providing another use to the tractor trailers; however, this patent has circulation limitations in urban or densely populated spaces because they are large vehicles or trucks characterized by a powerful motor and a robust chassis for transporting large amounts of weight.

U.S. patent with publication number U.S. Pat. No. 2,804,314A discloses a control for a fifth wheel with a means to limiting rotation, which comprises a pair of rotating gears, each mounted on a vertical swivel axis, with shoe brakes, drum and hydraulic expansion piston, with manual lever braking operation. However, this double-gear rotation and shoe limitation system is designed for high volume and heavy loads, so it is not practical to use it for high volume and lightweight loads in urban settings, adding unnecessary components that only take up space and increase the weight of the vehicle.

To summarize, state-of-the-art cargo vehicles present the following problems:

Circulation limitations and/or prohibitions for tractor vehicles with semi-trailers, balanced trailers or trailers with typically long conventional steering axles in urban spaces and densely populated areas.

High fuel consumption for towing high volume, low weight or high cubic coefficient loads.

Low practicality for transporting high volume, low weight or high cubic coefficient cargo.

Difficulties for driving in reverse controlling the direction that the tractor vehicle or the truck exerts on the semi-trailer and/or coupled trailer to perform backward and parking maneuvers due to the natural pivot that exists between the fifth wheel with the kingpin and/or the drawbar of the trailers attached to the rear end of a tractor vehicle or truck.

Difficulty in turning and maneuvering in urban areas with cargo trucks in urban spaces, or when maneuvering with trucks with balanced trailers or trailers with steering axles.

Difficulty in loading and unloading operations due to the large diameter of the wheels that place the goods higher above the ground.

The instability of rigid structure trucks due to a high center of gravity. These vehicles circulate generating a tendency to turn over in curves or when untimely maneuvers are carried out that compromise the stability of the moving vehicle.

Trucks, mini trucks, light trucks or boxcars with cargo or without cargo always occupy the same space when they travel on public roads, because the cargo platform and/or boxcar together with the driver's cabin are contained in the same rigid structure supporting the chassis that cannot be separated or articulated to reduce the turning radius of the wheels or from wall to wall as tractor-trailers with semi-trailers do.

Tractor-trailers with semi-trailers, trucks, mini trucks, light trucks or boxcars of the common type have non-optimal characteristics for efficient transportation of high cubic coefficient goods.

Tractor-trailers without any kind of semi-platform or coupled trailer, trucks, mini-trucks, light trucks and boxcars with transport capacities of approximately or more than 13 m$^3$ cannot be used as personal vehicles in urban spaces due to the length, width or height they occupy for parking.

In standard cargo trucks with dimensions determined for urban use with two or more axles, it is common for manufacturers to indicate maximum weights on each chassis axle, mainly on the rear drive axle(s) that receives the greatest payload. However, it is common practice to lengthen the original chassis for transporting goods with a high cubic coefficient, which makes maneuvering difficult on urban routes and in confined spaces as they require more space for wheel turns or wall to wall turns than the original vehicle itself, with consequences like the reduction in acceleration, loss of stability and deficient braking when the technical capacities of the original vehicle are modified due to the increase in the kinetic energy to be transported.

Additionally, trucks, mini-trucks, light trucks or boxcars occupy the same space on public roads with or without cargo, because it is technically impossible to separate the tractor part from the hopper or boxcar; this technical characteristic also immobilizes the vehicle during logistic operations, or maintenance or repair; the hoppers or platforms with boxcar are built and/or adapted for a certain logistic purpose that is not practical to change; these vehicles consume more fuel per cubic meter transported of finished products and raw materials of low weight and high volume or high cubic coefficient, because the main weight is the vehicles themselves and not the load.

These vehicles cannot be employed for personal use within urban spaces due to the dimensions they occupy when travelling and parking in public places such as buildings or underground car parks because of their excessive dimensions.

DESCRIPTION OF THE INVENTION

As a solution to the above-mentioned problems, the present invention was developed, consisting of a vehicle that is subdivided into two parts: a mini-tractor unit and a lightweight semi-platform. These are coupled by means of a fifth wheel with a kingpin, allowing transporting high cubic coefficient products including long formats; the resulting vehicle with interchangeable semi-platforms adapts to the different general traffic regulations as well as to the particular or specific ones of the different destinations and urban areas, making the present invention a vehicle suitable to circulate efficiently in different spaces through the quick exchange of semi-platforms which are coupled, articulated and offer wheel or wall-to-wall rotation smaller than any rigid transport vehicle with the same cubic capacity or total length.

The mini-tractor unit of the invention is shorter between the steering and drive axles compared with a vehicle for transporting cargo of the common type. The wheelbase between the steering (front) and driving (rear) axles of the mini-tractor unit is 1.3 to 1.7 times the width of the steering axle. With these proportions, the distances or measurements between the front steering axle and the rear drive axle are determined; the drive shaft between the gearbox output and the transmission crown where the semi-drive axles are located is less long between 40% and 60% with respect to the common type vehicle drive shaft, which facilitates the reduction of the total length of the original chassis including the elimination of the rear overhang, achieving a shorter total length in a range that varies from 15% to 25%. With these modifications, the mini-tractor unit weighs less than the original vehicle in a range varying from 10% to 20%; the reduction in weight on the mini-tractor unit transfers more payload capacity to any lightweight semi-platform that is coupled.

The mini-tractor unit of the invention provides shorter wheel and/or wall-to-wall turns than a truck, mini truck, light truck or any other transport vehicle with equal or less total length than the mini-tractor unit coupled to a lightweight semi-platform, due to the articulation between the mini-tractor unit and the semi-platform coupled by means of the fifth wheel and the kingpin.

In order to have more proximity between the mini-tractor unit and the lightweight semi-platform when they are coupled above the chassis equipped with a fifth wheel that is set with the kingpin, concave and convex designs are used between the closest parts of the vehicle that is subdivided in two, that is, in the rear part of the mini-tractor unit and the front part of the semi-platform, achieving couplings with minimum separations that provide improvements such as aerodynamics and greater safety.

It is also proposed that the semi-platform be low-bed, so that it is closer to the ground, facilitating access to the goods, as well as increasing the volume of cargo. This is because to circulate it is not necessary for the cargo vehicle to have a high platform in urban areas. At the same time, the volumetric capacities are optimized, generating useful spaces that are not typically used.

The mini-tractor unit of the invention is wider at the rear than a mini truck or light truck in a range of 16% to 23% when the drive axle of the original vehicle has single wheels and they are replaced by dual or double wheels. These provide greater stability due to a new lower center of gravity that allows for wider lightweight semi-platforms with greater volumetric capacity. The dual or double wheels provide greater tractive force in conjunction with a shorter drive shaft. Dual or double wheels also increase braking capacity by multiplying the road contact area when the mini-tractor unit is travelling alone or when it is coupled to a lightweight semi-platform equipped with dual or double wheel brakes installed on its axle(s). Preferably, the vehicle has dual wheels on one or more rear axles, located on the mini-tractor unit and/or the semi-platform.

The mini-tractor unit of the invention has the fifth wheel installed with a perpendicular separation of between 100 and 500 mm behind the modified drive axle, such position increasing the distribution of payload to be transported because the main weight is shared between the steering axle(s), the modified drive axle(s) and the axle(s) of the lightweight semi-platform.

The fifth wheel installed on the mini-tractor unit of the invention where the kingpin typically pivots is structurally fixed to the chassis with a rotating metal base that is supported by a central vertical axis containing a system of mechanisms that facilitate the control of the horizontal rotation of the coupled semi-platform. The mechanism acts to stop, totally or partially, the free rotation between the mini-tractor unit and the lightweight semi-platform at the driver's discretion. The system also provides greater safety going forwards, facilitates turns in curves or narrow streets and the performance of reversing and/or parking maneuvers in reduced spaces such as urban ones, allowing the driver to exercise steering control over the coupled semi-platform efficiently. The horizontal turning control mechanism located on the vertical axis where the kingpin typically pivots is simple, practical and strong enough to control the turning with low weight and high volume loads.

The system of mechanisms for the control of the horizontal rotation of the lightweight semi-platform includes systems that engage, fix and vertically lock the mini-tractor unit of the invention with the coupled lightweight semi-platform when they move together, eliminating the natural horizontal pivot between the fifth wheel and the kingpin by fully or partially immobilizing it when the driver assumes control to fix, orient and steer the coupled semi-platform in reverse and/or parking maneuvers. In forward gear, the system for controlling the horizontal rotation of the semi-platform prevents the lightweight semi-platform from misaligning or exceeding the straight alignment by preventing the semi-platform from articulating with a mini-tractor unit in the event of untimely braking, forming a rigid chassis with a minimum of three axles and ten wheels in contact with the road.

The system of mechanisms for controlling the horizontal rotation of the semi-platform has the same angular capacity of vertical free rotation (axial play) as the fifth wheel has on the axle that holds it to its own base, and that makes the fifth wheel a typically conventional system where the kingpin pivots on the horizontal plane, and in a limited way on the vertical plane (axial play), allowing the mini-tractor unit and the semi-platform to move coupled on uneven roads without affecting their normal operation.

The system of mechanisms for controlling the horizontal rotation between the mini-tractor unit of the invention and the coupled semi-platform can be obtained with the installation of friction or controlled rotation systems, such as shoe and drum brakes, disc brakes with sufficient capacity (force) to contain the lever arm or torque that the desired steering angle exerts considering the wheelbase(s) of the lightweight semi-platform and the optimum point of rotation formed by the fifth wheel with the kingpin when they are engaged.

Other ways to reach the objectives described is by using systems for assisted parking or electro-mechanical steering generated by electric engines with sensors installed in the mini-tractor unit of the invention as in the coupled lightweight semi-platform, which operate with the motor of the mini-tractor unit and/or also with electric mechanism systems contained in the wheel axles (rear and dual) of the lightweight semi-platform such as electric engines, servomotors or other similar systems installed in a vehicle that is articulated and subdivided in two; the objective is to improve the efficiency of the vehicle assembly in all types of displacements, reducing the lever arm or torque in parking lots when the independent turning capabilities produced by each wheel assisted by its own mechanism, energy, gear ratio and rotation direction are employed, making the present invention a vehicle with forward and reverse assisted motorization for routes that include slopes.

The interchangeable semi-platforms are equipped with electric brake systems that are connected and disconnected to the brake pedal in the driving cab of the mini-tractor unit of the invention through one or more electric joints, to facilitate the exchange of the semi-platforms. The system consists of an electronic circuit that commands an electromagnetic system with anti-lock wheels that acts on the brakes in the axle(s) of the semi-platform, and includes an electronic control and signaling panel with digital readout at sight and within the reach of the driver, allowing him to select the braking power on the axle(s) of the semi-platform depending on whether it is loaded, semi-loaded or unloaded.

With the electric brake system installed, there is better control over the new moving mass or kinetic energy contained and distributed between the axles of the mini-tractor unit and light semi-trailer; this technical feature increases the payload transported in a range that varies from 1.5 to 3.0 times that of the original vehicle.

The total weight on the lightweight semi-platform including the payload is transmitted through the kingpin to the fifth wheel which supports 60% to 30% of it; the variation of the total weight on the parts described is opposite to the number of axles installed on the semi-platforms. The more axles it has, the less weight on the kingpin and the fifth wheel.

The fifth wheel is equipped with weight sensors; the sensors use the load cells installed between the part of the fifth wheel that engages with the kingpin and the base that is fixed to the chassis joined by an axle where the fifth wheel oscillates vertically; the weight sensors detect the payload when the semi-platform is coupled with the kingpin to the fifth wheel of the mini-tractor unit of the invention.

Other weight sensors are installed between the suspension systems and the axle(s) with brakes and/or servomotors of the lightweight semi-platform; the weight sensors are digital load cells that are designed to support compression, tension or bending loads, allowing the detection of the deformation values; the digital load cells produce deformations through circuits that detect reactions; once the resistance is obtained, the transduction is produced and the weight values are obtained in all or in each one of the sensors monitored in a digital terminal.

The load signals from the weight sensors are taken to a central electronic device that collects the data from one or more load sensors and develops statistical analyses of the payload. This information is visible to the driver on a digital readout panel inside the cab and allows him to determine total or partial payload excesses before starting the load transport or also during the journey. If the transported load exceeds the capacities of the mini-tractor unit of the invention developed for transporting finished products and raw materials with a high cubic coefficient, the driver has the information available before starting the journey as well as during the journey when travelling on undulating paths and can use the traction provided by the semi-axles equipped with electrical systems on the wheels of the lightweight semi-platform.

All of this represents an improvement in the state of the art since it is a vehicle for transporting high cubic coefficient finished products and raw materials in urban spaces that is subdivided into two: a small-sized mini-tractor unit that weighs little, is wider at the rear and a semi-platform that is coupled using a fifth wheel with a kingpin to facilitate exchange options for various semi-platforms; the mini-tractor unit is equipped with a system of horizontal rotation control mechanisms for coupled semi-platforms that totally or partially stop the free pivot between the fifth wheel and the kingpin by means of a system that locks the mini-tractor unit coupled to the semi-platform and eliminates the horizontal free pivot or pivot typical of tractor-trailers with typically long, high and heavy semi-trailers, facilitating reversing and/or parking maneuvers; the mini-tractor unit coupled with a lightweight semi-platform equipped with independently assisted wheels with electric motorization systems make the whole a power-assisted vehicle; the mini-tractor unit is equipped with weight sensors on the fifth wheel. The semi-platform is equipped with electric brakes and weight sensors between the suspension system and the axle(s) tips, has less ground clearance and provides a lower center of gravity. The vehicle provides a more efficient ratio between the low weight transported and the power required to move high cubic coefficient goods; it has been developed for logistic activities in urban spaces or densely populated areas; the mini-tractor unit can also be used as a personal use vehicle due to its small dimensions and the efficiency of its power plant.

The present invention includes designs of lightweight semi-platforms with low-bed chassis, so called when most of the load semi-platform is located at the height of the axle (radius) of the wheel or below the tangent of the wheels that support it, characterized by having less clearance from the ground level that facilitates access to the goods and allows increasing the volume of payload. The volumetric variation is a function of the length, width, height and the clearance from the ground of the semi-platforms that are designed and built for this purpose.

In this way, the present invention overcomes the disadvantages of the state of the art mentioned above.

BRIEF DESCRIPTION OF THE FIGURES

Below, aspects and realizations of the invention are described based on some schematic drawings in which numerical references appear identifying the following elements.

PREFERRED EMBODIMENT OF THE INVENTION

Figure 1:
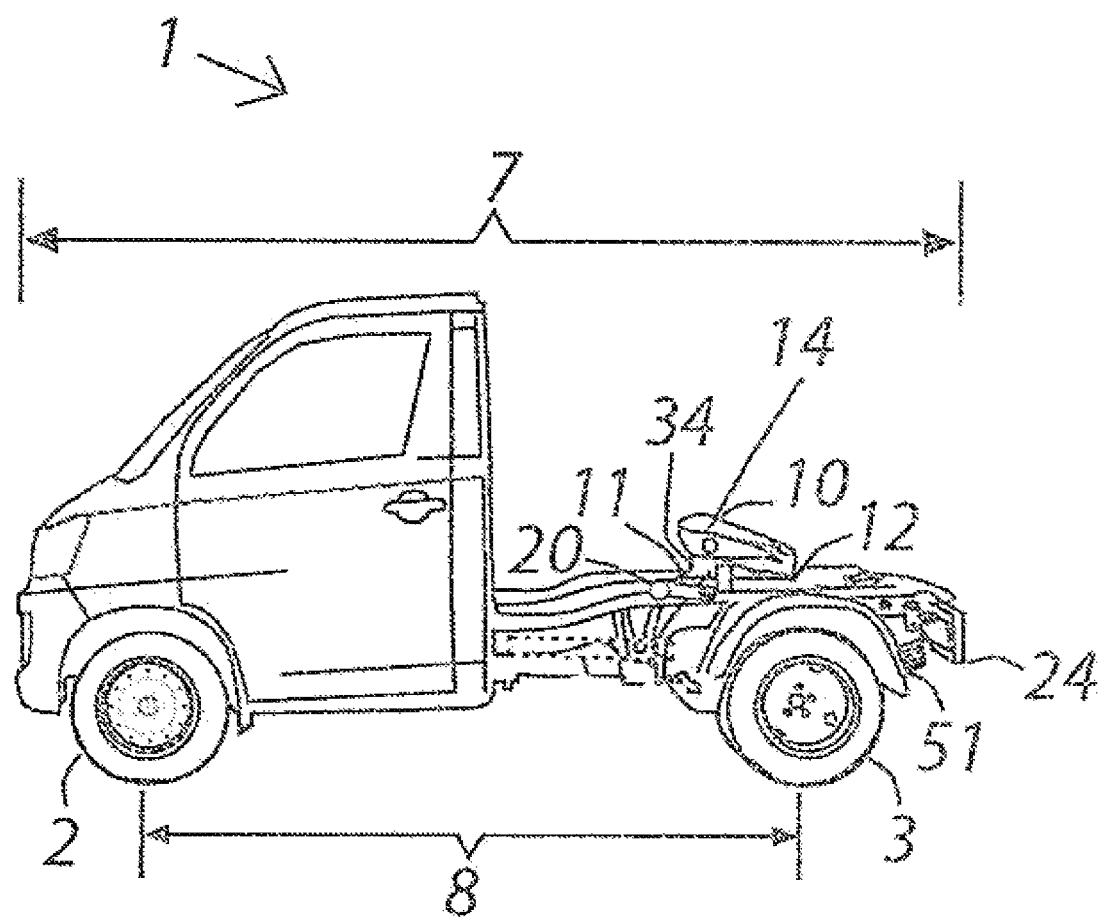
FIG. 1: The side view of the mini-tractor unit (1) is shown, it comprises front wheels (2), dual rear wheels (3), length of the mini-tractor unit (7), wheelbase (8), fifth wheel (10), perpendicular separation (11), base (12) for fifth wheel (10), horizontal brake (14), crank (20) with vertical and horizontal (18) cylindrical pins, convex rear fender (24), weight sensor (34) on fifth wheel, spare wheels (51).
Figure 2:
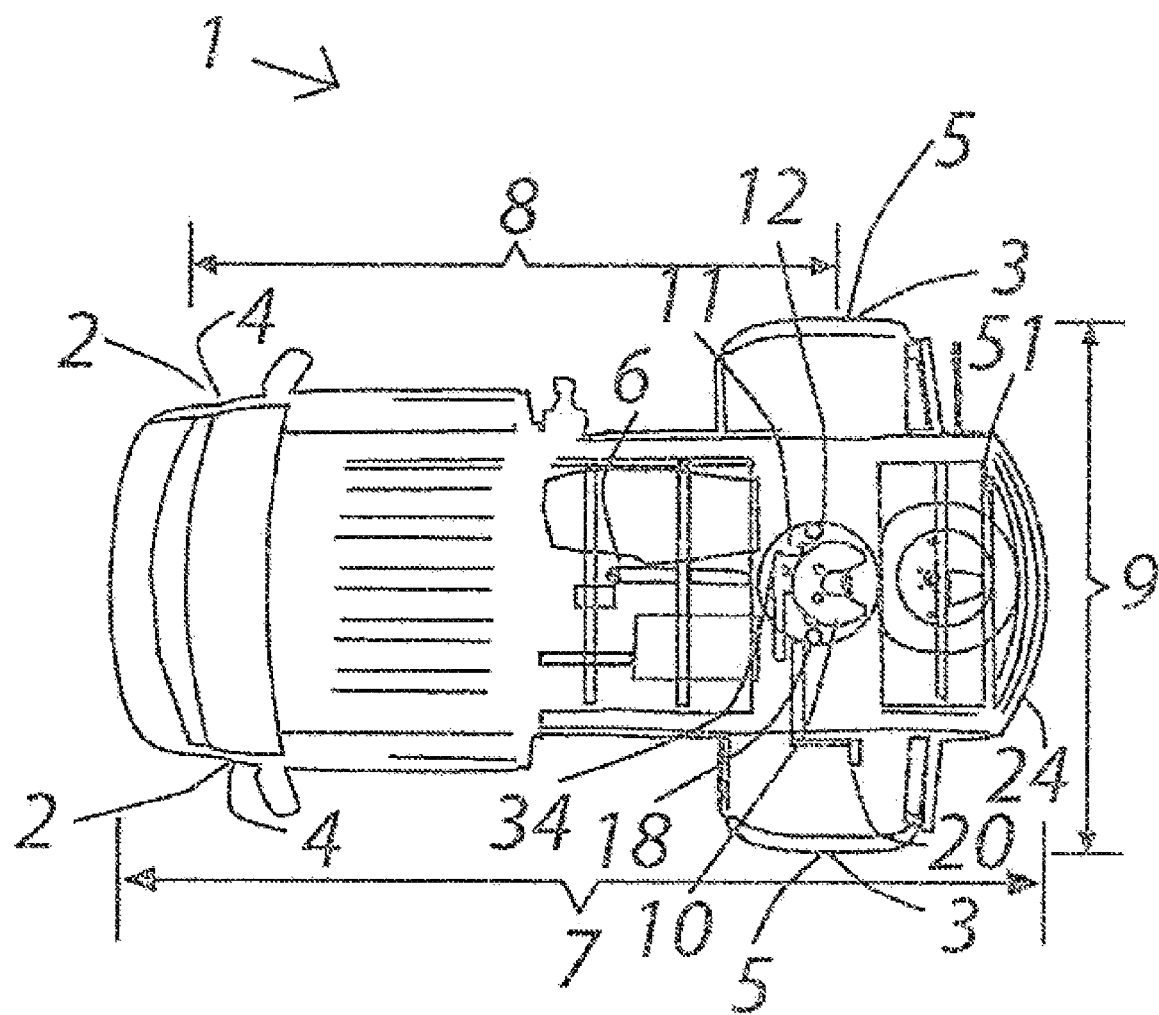
FIG. 2: The top view of the mini-tractor unit (1) is shown, it comprises front wheels (2), dual rear wheels (3), steering axle (4), drive axle (5), drive shaft (6), mini-tractor unit length (7), wheelbase (8) between steering axle and drive axle, rear width (9), fifth wheel (10), perpendicular separation (11) between fifth wheel (10) and drive axle (5), base (12) for fifth wheel (10), vertical and horizontal cylindrical pins (18), vertical and horizontal cylindrical pin crank (20), convex rear fender (24), weight sensor (34) on fifth wheel, spare wheels (51).
Figure 3:
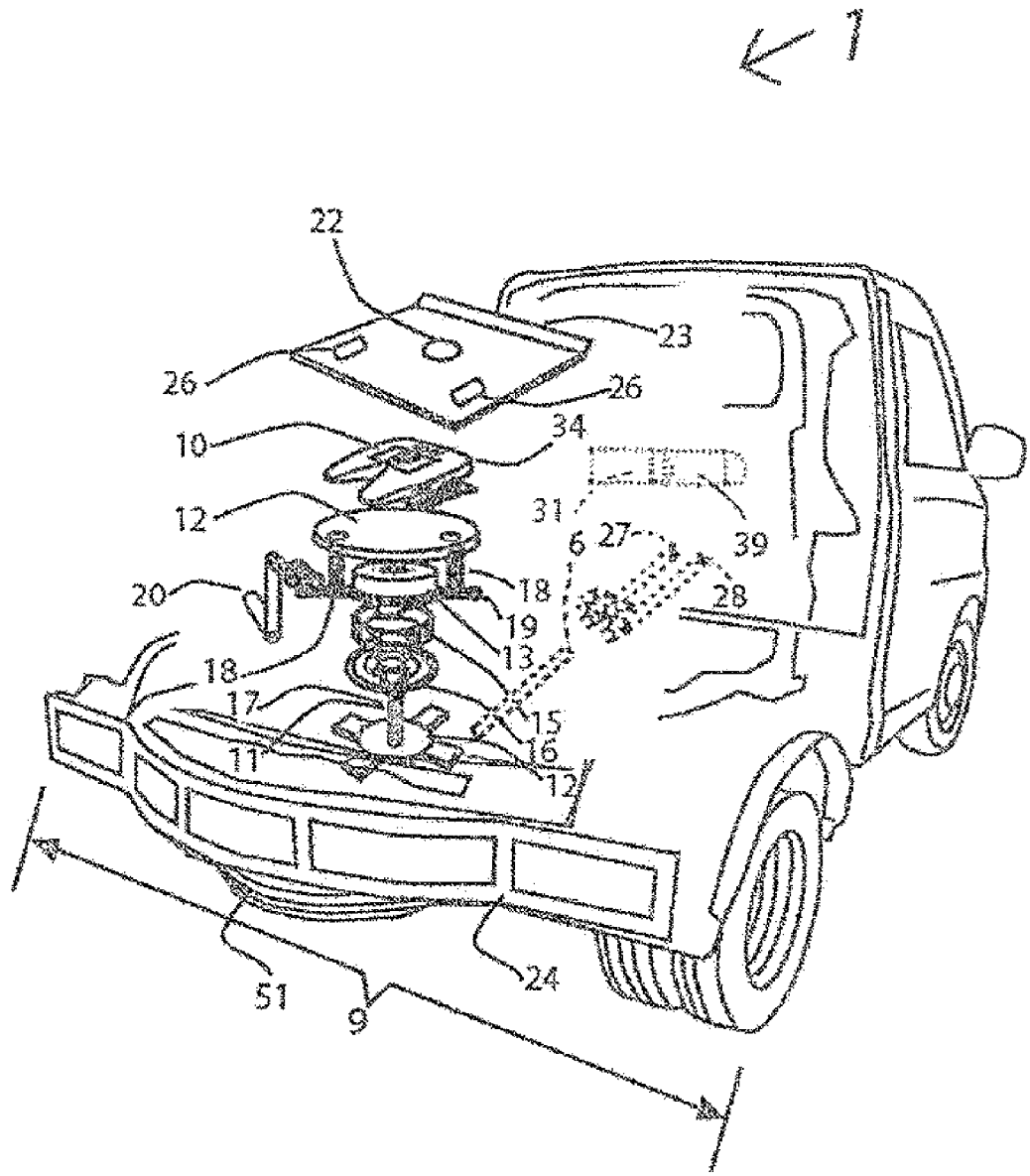
FIG. 3: The isometric view of the mini-tractor unit (1) is shown, it comprises a drive shaft (6), rear width (9), fifth wheel (10), perpendicular separation (11), horizontal brake drum (13), horizontal break shoes (15), vertical brake (14) shaft (16), horizontal brake (14) vertical axle (17), vertical and horizontal cylindrical pins (18), vertical and horizontal cylindrical pin (18) racks (19), crank (20) for vertical and horizontal cylindrical pins (18), position (22) for kingpin (21), safety plate (23), convex rear fender (24), cavity (26) for vertical and horizontal cylindrical pins (18), horizontal brake control (27) on fifth wheel (10), parking brake lever (28), electric brake (30) control panel (31), weight sensor (34) on fifth wheel (10), weight sensor (34) board (39).
Figure 4:
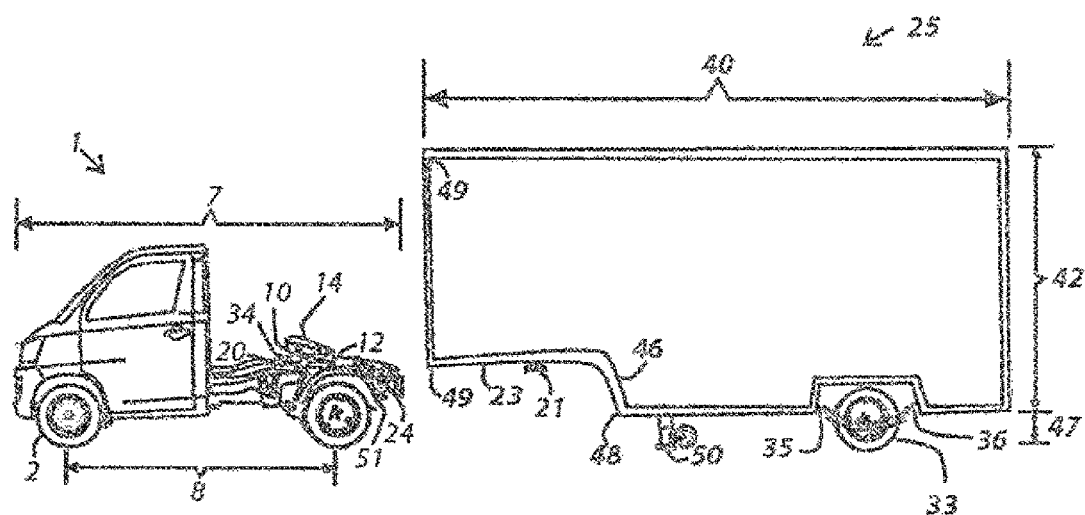
FIG. 4: The side view of mini-tractor unit (1) and uncoupled semi-platform (25) is shown, it comprises front wheels (2), mini-tractor unit length (7), wheelbase (8), fifth wheel (10), base (12) for fifth wheel (10), horizontal brake (14), crank (20) with vertical and horizontal cylindrical pins (18), kingpin (21), safety plate (23), convex rear fender (24), dual semi-platform wheels (33), weight sensor (34) on the fifth wheel, weight sensors (35) on the semi-platform axle, springs (36) of the semi-platform (25), extension (40) of the semi-platform (25), height (42) of the semi-platform (25), low-bed chassis (46) of the semi-platform (25), ground clearance (47) of the semi-platform (25), concave contact surfaces (48), convex contact surfaces (49), levelling jacks (50) with hinged wheels of the semi-platform (25), spare wheels (51).
Figure 5:
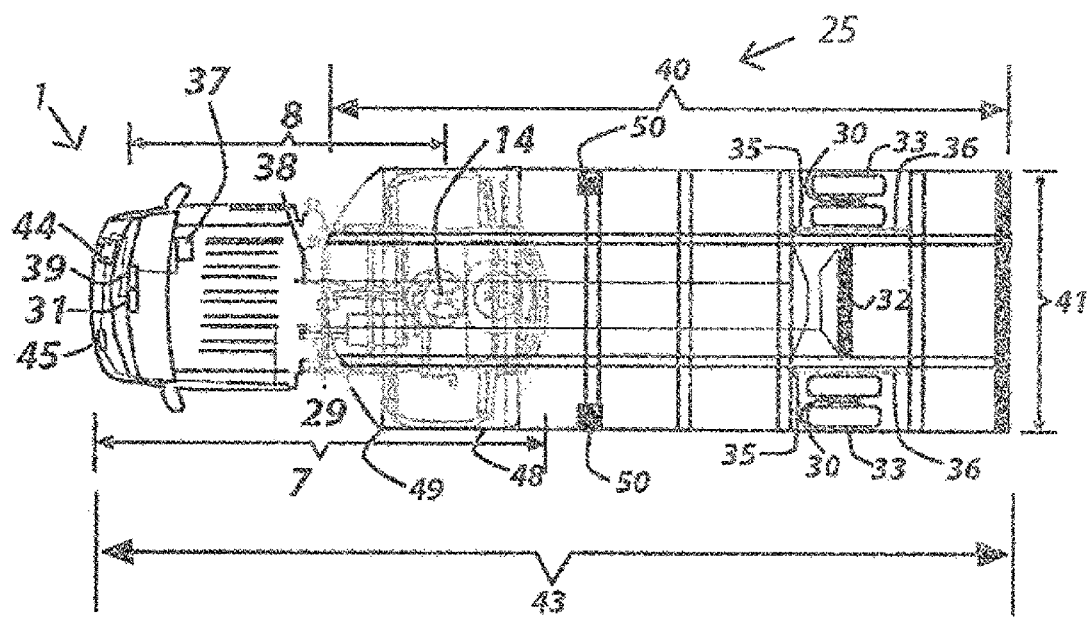
FIG. 5: The top view of the joint of the mini-tractor unit (1) and the semi-platform (25) is shown, it comprises the length (7) of the mini-tractor unit (25), wheelbase (8), horizontal brake (14), electric joint (29) of electric brakes (30), electric brakes (30) on the semi-platform (25), control panel (31) of electric brakes (30), axle (32) of semi-platform (25), dual wheels (33) of semi-platform (25), weight sensors (35) on semi-platform axle (25), springs (36) of semi-platform (25), transduction system (37), electrical joint (38) of the weight sensor system (34) (35), weight sensor (34) (35) board (39), extension (40) of the semi-platform (25), width (41) of the semi-platform (25) total length (43) of the coupled mini-tractor unit (1) and coupled semi-platform (25), DC battery (44), fuse box (45), concave contact surfaces (48), convex contact surfaces (49), leveling jacks (50) with hinged wheels of the semi-platform (25).
Figure 6:
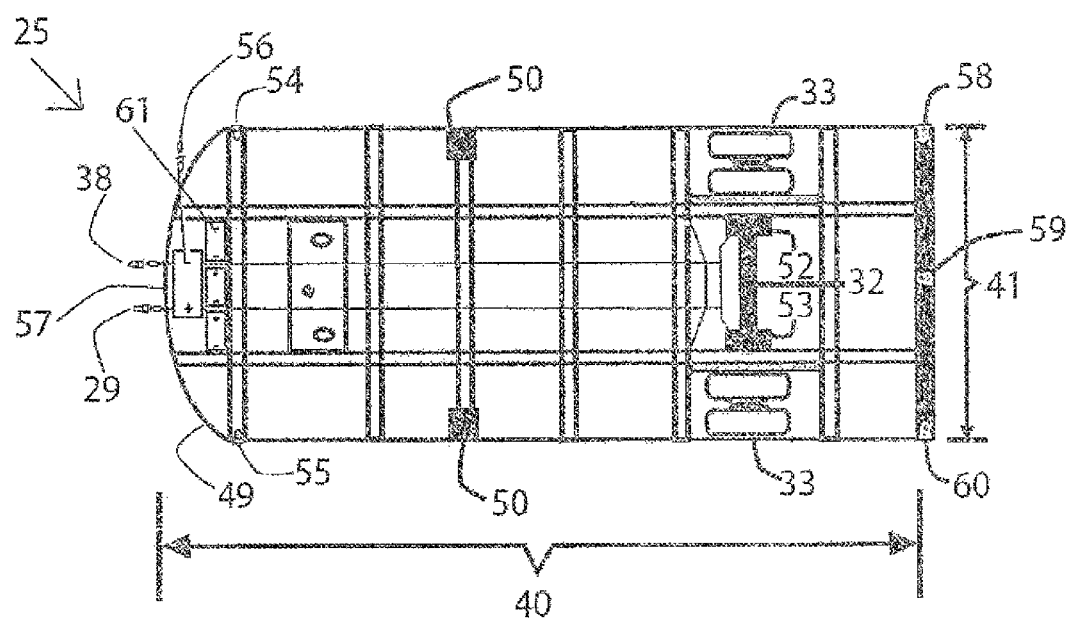
FIG. 6: The top view of the semi-platform (25) is shown, it comprises extension (40) of the semi-platform (25), width (41) of the semi-platform (25), electrical joint (29) of electric brakes (30), axle (32) of semi-platform (25), dual wheels (33) of semi-platform (25), electrical joint (38) of the weight sensor system (35), convex contact surfaces (49), leveling jacks (50) with semi-platform (25) hinged wheels, right electric motor (52) with semi-platform dual wheels (33), left electric motor (53) with semi-platform (25) dual wheels (33), right ultrasound scanning sensor (54), left ultrasound scanning sensor (55), AC power cord (56), AC to DC inverter (57), distance sensor (58) with right rear video camera, distance sensor (59) with central rear video camera, distance sensor (60) with left rear video camera, DC battery bank (61).

Although the present invention may be materialized in many different ways shown in the drawings and will be described in detail in the following preferred embodiments of the invention, it is understood that the present description is to be considered as an example of the principles of the invention and is not intended to limit the broad aspect of the invention to the illustrated embodiments.

The mini-tractor unit (1) resulting from the modification has a wheelbase (8) of 2,500 mm between the steering axle (4) and the drive axle (5), and is 460 mm shorter than in the mini truck, light truck; with the wheelbase (8), the length of the mini-tractor unit (7) is 3,800 mm, which makes it 820 mm shorter than the mini truck, light truck.

For this modification process, the original drive shaft is replaced by another drive shaft (6) 450 mm shorter, which allows the reduction of the length of the mini-tractor unit (7) to obtain the described 3,800 mm, where the elimination of the rear overhang is included; everything is welded together and the transverse reinforcements of the chassis are arranged to obtain greater structural resistance in the modified chassis. In this process, the distances of the hydraulic brake and fuel lines and the length of the brake cables and casings are reduced, including the cable of the handbrake lever (28), and electric light cables; the fuel tank and the exhaust emission system are rearranged and the spring plates are removed in order to obtain a more comfortable ride without affecting the resulting load capacity which is greater than the original vehicle's.

The mini-tractor unit (1) has a larger rear width (9) which is 2,010 mm total, resulting in 335 mm more than the original 1,675 mm, due to the replacement of the single rear wheels with dual rear wheels (3) on the drive axle (5) with false axle-point spacers that separate them from the chassis and facilitate the change of dual wheels.

With the cuts and modifications described so far, the mini-tractor unit (1) weighs 200 kg less, which is transferred as more payload capacity available in the semi-platforms (25) to be coupled, has greater stability and a lower center of gravity, has a smaller turning radius of the wheels and wall to wall, develops greater tractive force due to shorter drive shaft (6) and rear dual wheels (3), has better braking capacity due to the wider rear width (9) which increases the contact area with the ground or roadway through the rear dual wheels (3), installed to replace the single wheels with which the light truck, mini-truck is equipped.

In the modified chassis of the mini-tractor unit, a system of mechanisms is installed to obtain the control of the horizontal rotation of the semi-platform (25) coupled using a fifth wheel (10) of small dimensions according to the towing and gross load capacities obtained from the mini-tractor unit; the fifth wheel (10) is mounted on a vertical axle (17) which has a perpendicular separation (11) of 100 mm behind the modified drive axle (5) and remains mechanically attached to the top of the circular metal base (12) which is capable of fixing and exerting angular control in forward and reverse maneuvers with the desired horizontal rotation, when maneuvering with the semi-platform (25) coupled.

A horizontal brake (14) drum (13) containing horizontal brake (14) shoes (15) is fixed to the bottom of the metal base (12) as part of the mechanisms for controlling the horizontal rotation by means of the horizontal brake (14); the base (12) of the horizontal brake (14) is supported by a rigid vertical shaft (17) which is attached to a support (16) for the horizontal brake (14) that is part of the chassis structure of the mini-tractor unit.

The lower part of the circular metal base (12) contains vertical and horizontal cylindrical pins (18), which move at the same time mechanically to release the base (12) horizontally and obtain controlled turns by means of the mechanisms of the horizontal brake (14) installed in the mini-tractor unit (1); the mechanical system described above locks the semi-platform (25) vertically by operating a set of racks (19) which use a crank (20) to engage and disengage with more than one cavity (26) in the metal safety plate (23) as well as in the mini-tractor unit chassis (1). This operation is similar to raising and lowering the leveling jacks (50) with hinged wheels of the semi-platform (25), and is operated when the mini-tractor unit (1) and the semi-platform (25) are coupled and aligned straight; to remove or change any semi-platform (25) the same crank (20) is used by turning it in the opposite direction.

The mini-tractor unit (1) has a convex rear bumper (24), and the semi-platform (25) has a lower area with a concave surface, which is adjacent and corresponds to the convex rear bumper of the mini-tractor unit, thus maximizing the space in the lower area of the semi-platform (25). In addition, the top front part of the semi-platform (25) adjacent to the driver's cab has a convex contact surface, the purpose being to reduce typically unused spaces between tractor-trailers and semi-trailers, and to take advantage of the aerodynamic and safety effect, as well as the increased load volume on the semi-platform (25).

The metal safety plate (23) contains the kingpin (21) and more than one cavity (26) for vertical and horizontal rectangular shaped cylindrical pins (18) where they engage; each rectangular cavity has semi-circular ends that facilitate engagement as well as the axial movement that is generated vertically in the fifth wheel axle (10); the system that suspends the horizontal free rotation between the fifth wheel coupling (10) with the kingpin (21) allows vertical axial play between the mini-tractor unit (1) and the semi-platform (25) when the road surface or roadway is uneven.

The operation of the horizontal rotation control mechanisms contained in the horizontal brake (14) on which the fifth wheel (10) is installed and which allows the free rotation of the semi-platform (25) in forward, reverse and/or parking maneuvers, is operated from the driving cab using a horizontal brake (14) control (27) similar in size, position and operation to the handbrake lever (28), which is installed in parallel.

The mechanism systems for controlling the horizontal rotation between the mini-tractor unit (1) and the semi-trailer (25) can be obtained with the installation of friction or controlled rotation systems, such as drum brakes (13) and shoes (15), or disc brakes with sufficient capacity (force) to contain the lever arm or torque that the desired steering angle exerts with the wheelbase between the semi-trailer axle (32) and the point of rotation, formed by the fifth wheel (10) and the kingpin (21) when engaged.

These objectives are also achievable with the use of systems for assisted parking or electro-mechanical steering with ultrasound scanning sensors installed on the mini-tractor unit (1) and on the semi-trailer (25) which includes right ultrasound scanning sensor (54), left ultrasound scanning sensor (55), distance sensor (58) with right rear video camera, distance sensor (59) with central rear video camera, distance sensor (60) with left rear video camera; reversing and parking maneuvers are carried out with the right (52) and left (53) servomotors installed on the dual wheels (33) of the axle (32) of the semi-platform (25) which complement or replace the horizontal brake system (14) and reduce the lever arm or torque when the independent turning capabilities of each servomotor are used and make the vehicle a power-assisted unit for normal driving, reversing and/or parking maneuvers, when the vehicle is moving; spaces available for parking are identified using the parking commands that turn the steering wheel and the driver only engages the respective reverse gear, forward gear, operating the brake, clutch and accelerator.

The semi-platform (25) coupled to the mini-tractor unit (1) is equipped with batteries (61), has an AC to DC inverter (57) with which the batteries (61) are recharged, which feeds energy to the right servomotor (52) and the left servomotor (53) installed on the dual wheels (33) of the axle (32) of the semi-platform (25) and keep active the weight sensor (34) of the fifth wheel (10) and weight sensors (35) on the semi-platform axle (32) located between the springs (36) of the suspension semi-platform (25) and the axle (32), which provide payload information when the semi-platform (25) is coupled to the mini-tractor unit (1); the purpose is to provide information and facilitate reverse and forward travel to obtain different turning angles that facilitate space-saving parking maneuvers.

The lightweight semi-platform (25) is equipped with an electric brake system (30) which is connected and disconnected to the mini-tractor unit (1) using one or more electric joints (29) which depend on a DC battery (44) and a general fuse box (45) for correct operation.

The system is made up of an electronic circuit which commands an electromagnetic system equipped with an anti-lock system for the dual wheels of the semi-platform (33) which acts on the electric brakes (30) installed at each end of the semi-platform axle (32), and includes within the control panel (31) an automatic brake power adjustment system which responds immediately to the pressure of the brake pedal in the driver's cab of the mini-tractor unit (1).

The equipment contains an electronic control and signaling panel (31), installed within sight of the driver, which allows him to select the braking power on the semi-platform (25) axle (32), which is equipped with dual semi-platform wheels (33) in order to increase the contact area with the ground or roadway and improve braking capacity.

The required braking power on the dual semi-platform wheels (33) of the semi-platform axle (32) is adjustable, depending on whether the semi-platform (25) is loaded, semi-loaded or unloaded.

The control provided by the electric brake system (30) over the new moving mass or kinetic energy contained in the semi-platform (25), allows the mini-tractor unit (1) to increase the payload transported in a variable range of 1.5 to 3.0 more than the payload provided by the original vehicle, depending on its performance at sea level.

The total weight of the semi-platform (25) including the payload is transmitted through the kingpin (21) to the fifth wheel (10) that supports up to 60% of the payload equipped with a single axle (32) of semi-platform (25) with dual semi-platform wheels (33).

The semi-platform (25) is equipped with a weight sensor (34) on the fifth wheel (10) that uses load cells installed between the fifth wheel (10) and the metal base (12) that act to record the payload when the semi-platform (25) is coupled with the fifth wheel (10).

Other load cells or weight sensors (35) are installed on the semi-platform axle (32) and are located between the springs (36) of the suspension semi-platform (25) and the semi-platform (25) axle (32). The load cells designed to support compression, tension and bending loads are installed to detect the deformation values; the digital load cells produce deformations through circuits that detect cascade reactions; once resistance values are obtained, they are transmitted using a transduction system (37); with these values, appropriate loads, overloads and/or average weights are determined.

The load signals detected in cascade are transmitted from the semi-platform (25) to the tractor head (1), through the junction (38) which interconnects with a central electronic device or board (31) that collects the total data from one or several load cells and develops statistical load analyses; the information is at the sight of the driver in a control board (31), and allows determining overweight before starting the transfer or also during the journey.

If the load being transported exceeds the towing capacities of the mini tractor head (1) developed for transporting high cubic coefficient finished products or raw materials, the driver has the information at all times and can use the assisted drive generated by the right servomotor (52) and the left servomotor (53) installed on the dual wheels (33) of the axle (32) of the semi-platform (25).

Considering the regulatory limitations for the dimensions of freight vehicles within urban spaces, the preferred model is developed considering semi-platforms (25) with low-bed chassis (46), characterized by a lower ground clearance (47) of 300 mm, which increases the load volume and results in a lower center of gravity.

The preferred model is made up of a mini-tractor unit (1) and a lightweight semi-platform (25) that, when coupled, have a total length (43) of 8,200 mm, which has the advantage of being articulated 2,200 mm from the front of the mini-tractor unit, making it a vehicle suitable for driving in urban spaces.

The aerodynamic and safety advantages maximize the volume transported, facilitating the use of typically unused spaces between tractor-trailers and semi-platforms, which leave large spaces to avoid contact between both parts during turning maneuvers when they are articulated; in the case of the preferred model, these spaces between surfaces are reduced and are complemented by concave contact surfaces (48) and convex contact surfaces (49) when the mini-tractor unit (1) is articulated with the semi-platform (25).

The preferred measures correspond to a semi-platform (25) with a low bed chassis (46) that has an semi-platform extension (40) of 6,000 mm, with a semi-platform width (41) of 2,010 mm and a semi-platform height (42) of 3,000 mm; with these measures, a load volume 5 times greater than the mini-truck, light truck is obtained and it is 1,040 mm shorter than 2 mini truck, light truck units aligned one after the other, considering that between them they can only transport 20% of the capacity of the mini-tractor unit (1); with the semi-platform (25) of the preferred model, the advantages described are evident.

It is clear, therefore, that the present invention overcomes the disadvantages of the state of the art mentioned above.

The invention claimed is:

1. An urban vehicle for transporting large volume and light weight cargo of the type it presents: a mini-tractor unit (1) comprising front wheels (2) coupled to a steering axle (4) and rear wheels connected by a drive axle (5) driven by a drive shaft (6) at the bottom, as well as a fifth wheel (10) which is permanently supported on a base (12) at the rear and a semi-platform which has a chassis (46) and a safety plate (23) for coupling a kingpin (21), characterized in that:
   the wheelbase between the steering and driving axles (8) of the mini-tractor unit is 1.3 to 1.7 times the width of the steering axle (4)
   the fifth wheel (10) has friction or controlled rotation mechanisms applied directly to the point of rotation between the fifth wheel and the kingpin, to stop or limit the horizontal rotation of the semi-platform
   the lower part of the base (12) contains cylindrical pins (18), which move at the same time mechanically to release the base (12) horizontally and obtain controlled turns using a horizontal brake (14) installed in the mini-tractor unit (1) as part of the controlled rotation mechanisms; wherein the controlled rotation mechanisms vertically lock the semi-platform (25) by operating a set of racks (19) which use a crank (20) to engage and disengage with more than one cavity (26) in the safety plate (23) as well as in the chassis (46).

2. The vehicle according to claim 1, wherein the mini-tractor unit (1) has a convex rear bumper (24), and the semi-platform has a concave lower area (48) adjacent and corresponding to the convex rear bumper (24) of the mini-tractor unit to maximize the load volume of the semi-platform.

3. The vehicle according to claim 1, wherein the fifth wheel is positioned vertically between 100 and 500 mm behind the drive axle.

4. The vehicle according to claim 1, wherein it comprises an electrical system composed of batteries (44, 61), electrical joints, transduction system (37), power inverter (57), ultrasonic scanning sensors (54, 55) and distance sensors (58, 59 and 60) for the assisted parking of the vehicle, installed on the mini-tractor unit and the semi-platform.

5. The vehicle according to claim 4, wherein the fifth wheel (10) coupled to the mini-tractor unit (1) or the semi-platform has one or more weight sensors (34, 35) connected to the electrical system.

6. The vehicle according to claim 1, wherein the friction or controlled rotation mechanisms of the semi-platform comprise brakes which are preferably equipped with drum (13), shoes (15) support (16) and racks (19).

7. The vehicle according to claim 1, wherein the semi-platform (25) has electric brakes (30) on its wheels, which are connected and disconnected by means of one or more electric joints to facilitate the change of the semi-platforms.

8. The vehicle according to claim 1, wherein the semi-platform (25) has a convex surface (49) in its upper front part adjacent to the driving cab.

9. The vehicle according to claim 1, wherein one or more rear axles comprise dual wheels.

10. The vehicle according to claim 9, wherein the semi-platform (25) has electric motors (52 and 53) coupled to its dual wheels (33).

11. The vehicle according to claim 9, wherein the rear of the mini-tractor unit is wider than the front by between 16% and 23%.

\* \* \* \* \*